United States Patent
Siddiqui et al.

(10) Patent No.: US 7,490,000 B2
(45) Date of Patent: Feb. 10, 2009

(54) FUEL ECONOMY CONTROL SYSTEM AND CONTROL STRATEGY

(75) Inventors: Shahid Siddiqui, Northville, MI (US); Allen Duan, Ann Arbor, MI (US); Vijay Garg, Canton, MI (US); Joseph Stanek, Northville, MI (US); Elaine Chen, Dearborn, MI (US); Ramakrishna Raju, West Bloomfield, MI (US); Steven Schondorf, Dearborn, MI (US); Floyd Cadwell, Dearborn, MI (US); George Dolan, Commerce Township, MI (US); Jeffrey Boismier, Rockwood, MI (US)

(73) Assignee: Ford Motor Company, Dearborn, MI (US)

( * ) Notice: Subject to any disclaimer, the term of this patent is extended or adjusted under 35 U.S.C. 154(b) by 156 days.

(21) Appl. No.: 11/511,560

(22) Filed: Aug. 29, 2006

(65) Prior Publication Data

US 2008/0059035 A1    Mar. 6, 2008

(51) Int. Cl.
*B60L 9/00* (2006.01)
*G01F 17/00* (2006.01)
*B60T 8/32* (2006.01)

(52) U.S. Cl. .................. 701/104; 701/93; 701/22
(58) Field of Classification Search ............ 701/104, 701/103, 102, 115, 93, 22, 123; 123/352, 123/480

See application file for complete search history.

(56) References Cited

U.S. PATENT DOCUMENTS

| 4,242,922 | A | 1/1981 | Baudoin |
| 4,468,987 | A * | 9/1984 | Miller .................. 477/127 |
| 5,014,200 | A | 5/1991 | Chunkrlik et al. |
| 5,627,438 | A | 5/1997 | Barrett |
| 5,841,201 | A | 11/1998 | Tabata et al. |
| 6,223,117 | B1 | 4/2001 | Labuhn et al. |
| 6,244,986 | B1 | 6/2001 | Mori et al. |
| 6,295,500 | B1 | 9/2001 | Cullen et al. |
| 6,470,256 | B1 * | 10/2002 | Cikalo et al. ............... 701/93 |
| 6,560,525 | B1 | 5/2003 | Joyce et al. |
| 6,832,148 | B1 | 12/2004 | Bennett et al. |
| 6,941,216 | B2 | 9/2005 | Isogai et al. |
| 7,333,885 | B2 * | 2/2008 | Kakuya et al. ............. 701/102 |

FOREIGN PATENT DOCUMENTS

| JP | 2003335151 | 11/2003 |
| JP | 2003343305 | 12/2003 |

\* cited by examiner

*Primary Examiner*—Hieu T Vo
(74) *Attorney, Agent, or Firm*—Tung & Associates

(57) ABSTRACT

An alternative fuel vehicle having a fuel economy control module with associated logic that allows the vehicle to operate in a fuel economy mode based on a desired fuel economy preference. The fuel economy control logic is in electrical communication with a vehicle system controller (VSC) and may be integrally formed as a sub-module within the VSC. A fuel economy control switch controlled by the fuel economy control logic toggles between an on and an off position to enable or disable a fuel economy mode. A fuel economy control selector allows a user to select a desired fuel economy mode preference once the fuel economy control switch is on. The fuel economy mode selected represents a predefined desired fuel economy preference such as a distance per amount of fuel consumed, or alternatively, a percentage of a balance between a fuel economy operation and a fuel performance operation.

18 Claims, 4 Drawing Sheets

FUEL ECONOMY CONTROL SYSTEM AND CONTROL STRATEGY

FIELD OF THE INVENTION

The present invention generally relates to a vehicle having a fuel economy mode for use in the field of fuel economy vehicle controls.

BACKGROUND

Customers are becoming increasingly concerned about fuel economy. Fuel efficient and alternative fuel vehicles are typically sold for better fuel economy. However, customers are not always getting the fuel economy that they expect from vehicles such as electric, hybrid, hybrid electric or fuel cell vehicles. The same is probably true in conventional vehicles, but hybrid customers are especially sensitive to fuel economy. The engineers who design vehicle control systems in conventional or fuel economy vehicles make assumptions about how the average customer will use the vehicle and then optimize the vehicle's performance accordingly. Thus, engineers may choose a different balance between performance modes and fuel economy modes than a customer.

Due to the components and architecture of alternative fuel vehicles, such as electric, hybrid, hybrid electric or fuel cell vehicles, the ability to control and impact the balance between performance and fuel economy is much greater than in a conventional powertrain. Therefore, such an option may result in higher customer satisfaction than a similar option provided for a conventional power train vehicle.

Customer satisfaction may be further enhanced by an economy mode option in an alternative fuel vehicle due to the fact that a significant proportion of customers do not buy an alternative fuel as a no-compromise vehicle. Instead, alternative fuel vehicle customer's purchasing decisions include consideration of both fuel economy and emission benefits. Thus customers may view a fuel economy mode as a desired benefit when purchasing a vehicle that includes such a fuel economy mode option.

While existing devices suit their intended purpose, the need remains for a device and method that provides a fuel economy mode control system and strategy to allow a user to select a desired fuel economy mode associated with a vehicle.

SUMMARY

A fuel economy control system and strategy is provided for an alternative fuel vehicle such as an electric, a hybrid electric, or a fuel cell vehicle. Generally, a fuel economy control module having associated logic is provided to allow the vehicle to operate in a fuel economy mode based on a desired fuel economy preference selected by a customer. The fuel economy control logic is in electrical communication with a vehicle system controller (VSC) and may be integrally formed as a sub-module within the VSC. A fuel economy control switch in the form of a selectable button or switch that toggles between an on and an off position to enable or disable a fuel economy mode operation is controlled in accordance with the fuel economy control logic. Additionally, a fuel economy control selector in operative electromechanical communication with the fuel economy control switch may be provided to allow a user to select a desired fuel economy mode preference once the fuel economy control switch is actuated. Each of the switch and selector are in further electro-mechanical communication with and are controlled by the fuel control logic to allow a user to select a desired fuel economy mode. The fuel economy mode selected may represent a predefined fuel economy preference such as a distance per amount of fuel consumed, for example, miles per gallon, or alternatively, may be selected as a percentage of a balance between a fuel economy operation and a fuel performance operation.

BRIEF DESCRIPTION OF THE DRAWINGS

These and other objects, features and advantages of the present invention will become apparent from the following detailed description and the appended drawings in which.

DETAILED DESCRIPTION OF THE INVENTION

The present invention generally provides a new tool for a driver of a vehicle to choose a balance between a fuel economy attribute and other performance-related attributes. In hybrid electric vehicles, there is significant control over operating strategies/calibrations that impact the balance between performance and fuel economy. In operation, a fuel economy control switch and a desired fuel economy value may be selected alone or in combination. The fuel economy selector value indicates a user's fuel economy preference, which may be, for example a predefined number of miles per gallon, or alternatively, the selected fuel economy value may represent a balance between economy and performance modes for a vehicle program. A single calibration strategy or alternatively multiple calibration strategies may be created to meet the balance. A fuel economy selector or similar user interface may be used to allow the driver to select a fuel economy value, wherein the vehicle operates in modes which are optimized toward performance, fuel economy, or a combination thereof.

The driver may set a 'Desired Fuel Economy' to be maintained similar to setting the 'Speed' with a cruise control system or setting the 'Speed and Following Distance' in an adaptive cruise control system. The vehicle control system may then vary the control strategy to try to achieve that fuel economy, trading off performance as necessary.

Figure 1:
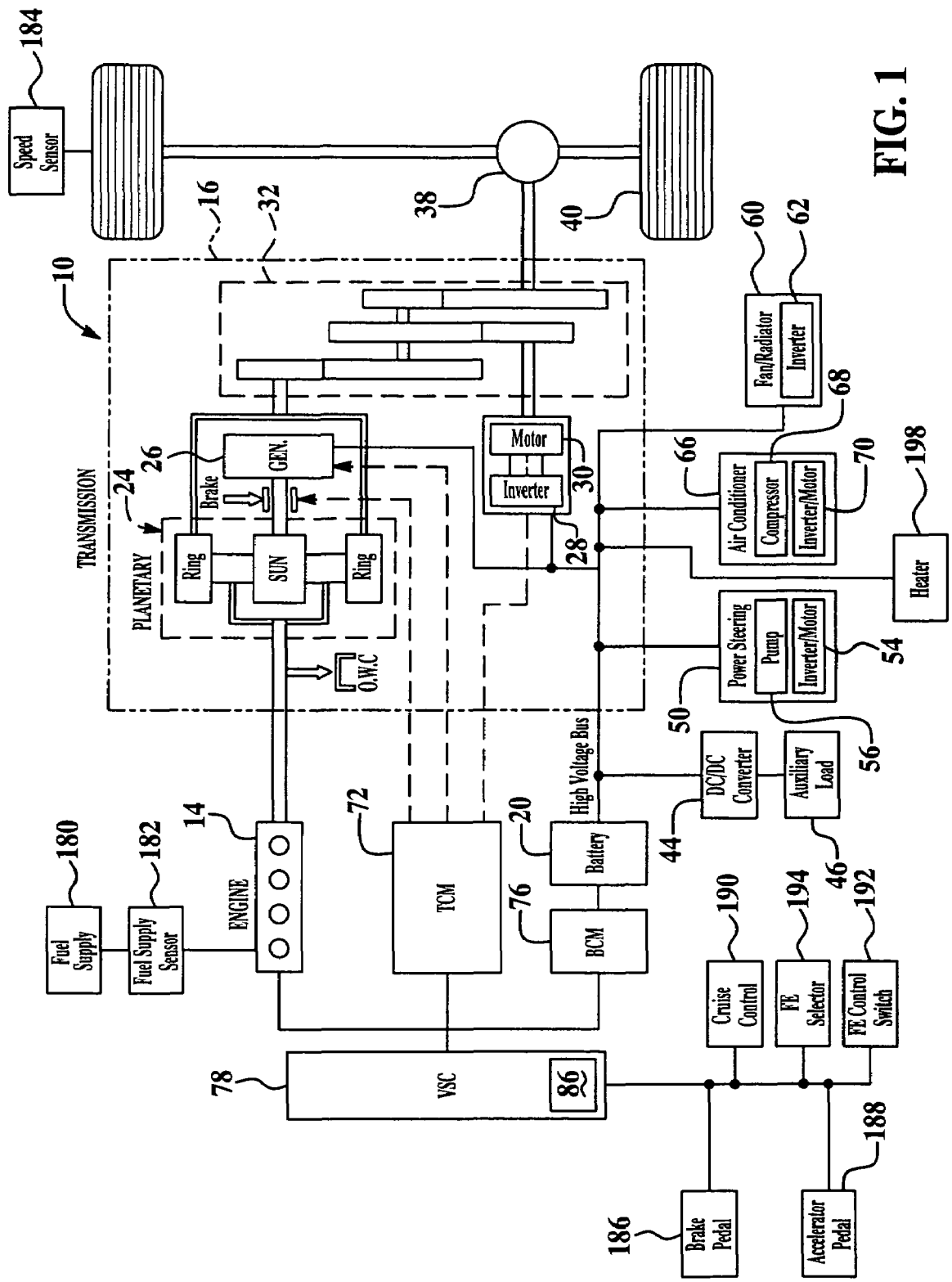
FIG. 1 illustrates a hybrid electric vehicle having a fuel economy mode module in accordance with one embodiment of the invention.
Figure 4:
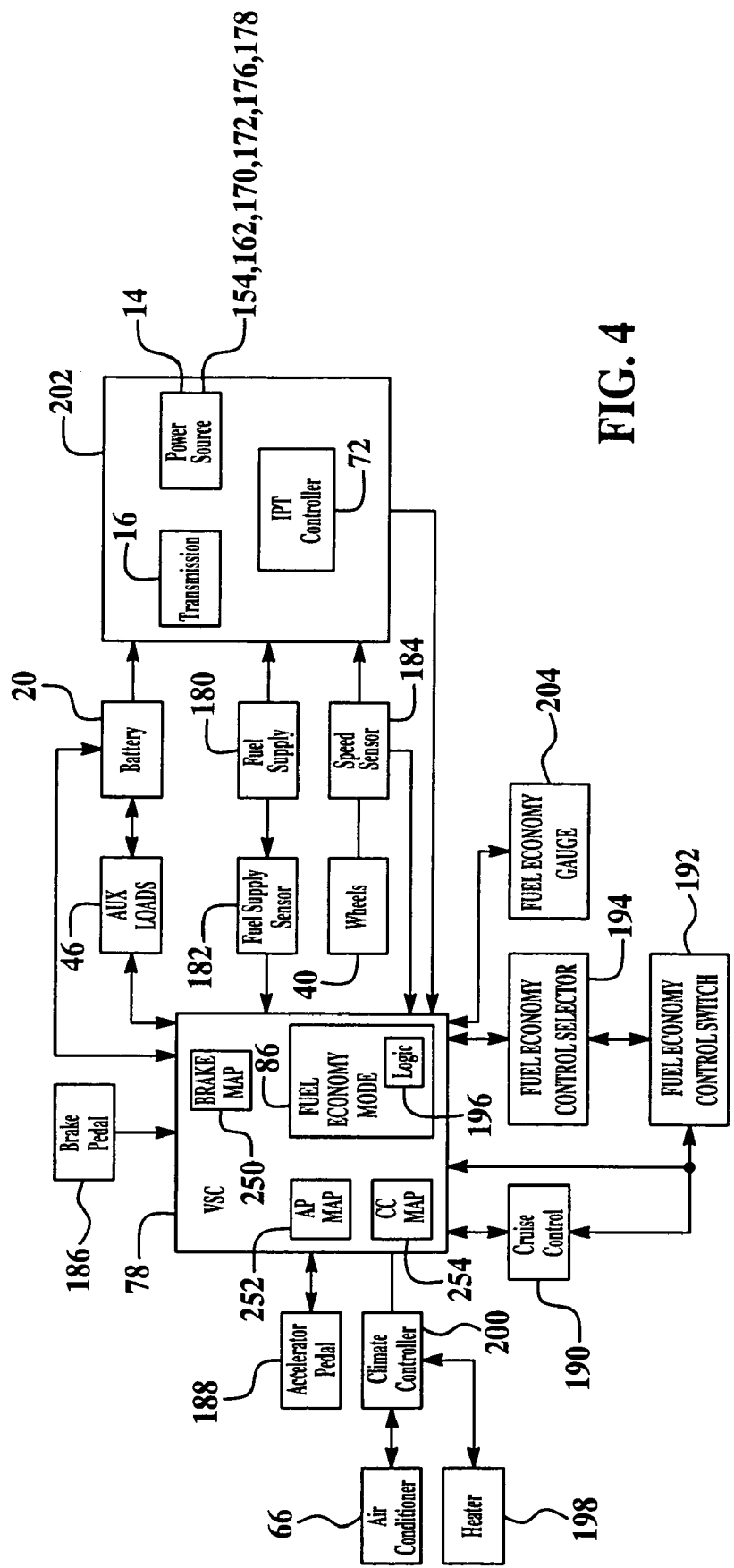
FIG. 4 illustrates a block flow diagram of a fuel economy mode system in accordance with one embodiment of the invention.

FIG. 1 illustrates an exemplary hybrid electric vehicle (HEV) 10 commonly referred to as parallel-series hybrid electric vehicle (PSHEV) 10 and includes the fuel economy mode control system and strategy in accordance with one embodiment of the present invention. The present invention can be used, however, with any hybrid or non-hybrid system without deviating from the scope of the present invention, including vehicles powered by internal combustion engines, series hybrid electric vehicles (SHEV), parallel hybrid electric vehicles (PHEV), fuel cell vehicles (FIG. 2) and electric vehicles. FIG. 4 illustrates a block flow diagram of the fuel economy mode control system in accordance with one embodiment of the invention.

HEV 10 includes electrically operated or controlled components including engine 14, transmission 16, and battery 20. These components operate with planetary gear set 24, generator 26, inverter 28, motor 30, and countershaft gearing 32 for powering differential axle 38 and wheels 40. DC/DC converter 44 regulates power provided to auxiliary loads 46. Power steering unit 50 provides power steering of dirigible wheels, not shown. Power steering unit 50 includes pump 54 powered by inverter motor 56. Fan/radiator unit 60, which cools motor 30 and engine 14, is powered by inverter 62. Air conditioning unit 66, which provides cooling for a vehicle passenger compartment includes compressor 68 powered by inverter motor 70. A climate control unit (shown in FIG. 4) is in electro-mechanical communication with both the air conditioning unit 66 and a heater 198, which provides heating for a vehicle passenger compartment. Transmission control module (TCM) 72 controls and monitors the torque output of engine 14 and motor 30. Then engine 14, transmission 16, and TCM cooperate to form an integrated power train (IPT) as is shown and discussed in further detail in FIG. 4.

Battery control module 76 monitors and controls battery 20, which provides power to the VSC 78. A current state of charge signal, or battery voltage may be sent by the battery 20 to the VSC.

Vehicle system controller 78 (VSC) controls all aspect of vehicle operation. VSC 78 monitors vehicle operation and selects/controls HEV 10. VSC 78 generates and transmits signals to the vehicle components. The components operate as instructed by VSC 78. VSC 78 can control each component independently and collectively to control vehicle operation.

In one embodiment of the invention, HEV 10 includes fuel economy control module 86. Fuel economy control module 86 provides fuel economy control logic 196 to control operation of a fuel economy control switch 192, a selectable fuel economy control selector 194, wherein the selector 194 may be a button or a dial used to select a desired fuel economy preference as a fuel economy value when the vehicle 10 is operating in a fuel economy mode.

In one embodiment of the invention the fuel economy control module 86 and associated logic 196 as shown in FIGS. 1 and 4, may reside within the VSC 78.

In one embodiment of the invention, the fuel economy control module 86 may be in operative communication with the VSC 78 but may reside in a separate location from the VSC 78 (not shown).

Signals from the fuel economy control module 86 are fed back to VSC 78. VSC 78 can control operation of fuel economy associated with the HEV 10 based on the operation of the fuel economy control module 86. The fuel economy control module 86 may be used either alone or alternatively, in combination with a cruise control module 190.

Figure 2:
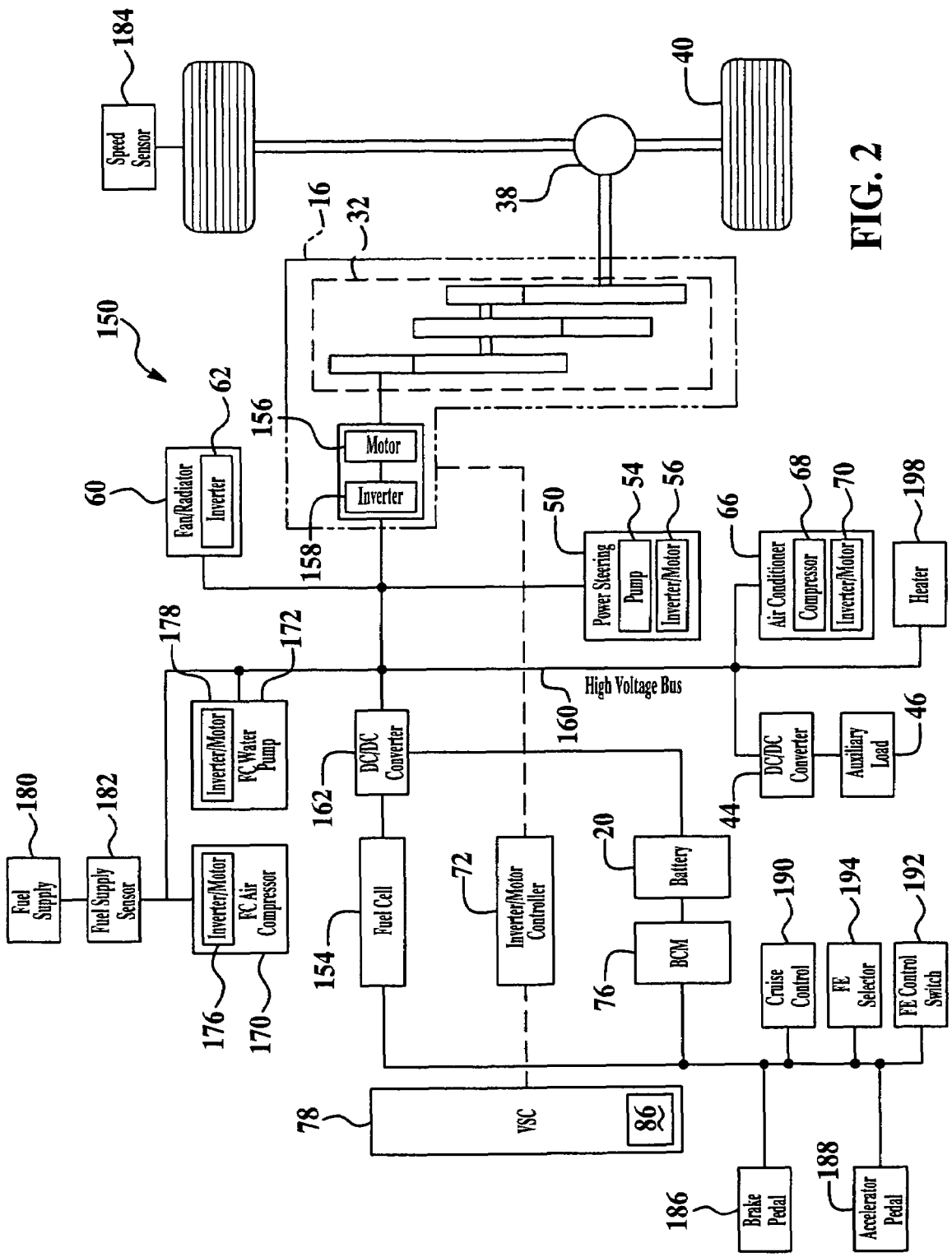
FIG. 2 illustrates a fuel cell vehicle having a fuel economy mode module in accordance with one embodiment of the invention.

FIG. 2 illustrates an exemplary fuel cell vehicle 150. Fuel cell vehicles include components similar to those described above with respect to vehicles with internal combustion engines.

Fuel cell vehicle 150 operates in a manner similar to that described above with respect to HEV 10. The common features and operation are shown with the same reference numerals as those used above with respect to HEV 10. The modified operation of fuel cell vehicle 150 in response to operating in a fuel economy mode is likewise controlled.

Unlike HEV 10, fuel cell vehicle 150 (FIG. 2) includes fuel cell 154 and a traction motor 156. Fuel cell 154 replaces engine 14, but it is similarly controlled by VSC 78. The traction motor 156, powered by inverter 158 and gearing 32, replaces planetary gear set 24 of FIG. 1 and is controlled by VSC 78. Inverter/Motor 156, 158 operates on power provide to high voltage bus 160. High voltage bus 160 receives power from DC/DC converter 162. DC/DC converter 162 receives power inputs from fuel cell 154 and high voltage battery 20. Fuel cell 154 further includes fuel cell air compressor 170 and water pump 172. Each includes respective inverter/motor combinations 176 and 178. Fuel cell air compressor 170 provides air to fuel cell 154. Fuel cell water pump 172 provides water to fuel cell 154. The fuel cell air compressor 170, water pump 172, associated inverter/motor combinations 176 and 178, fuel cell 154, and transmission 16 cooperate to form an IPT 202.

Figure 3:
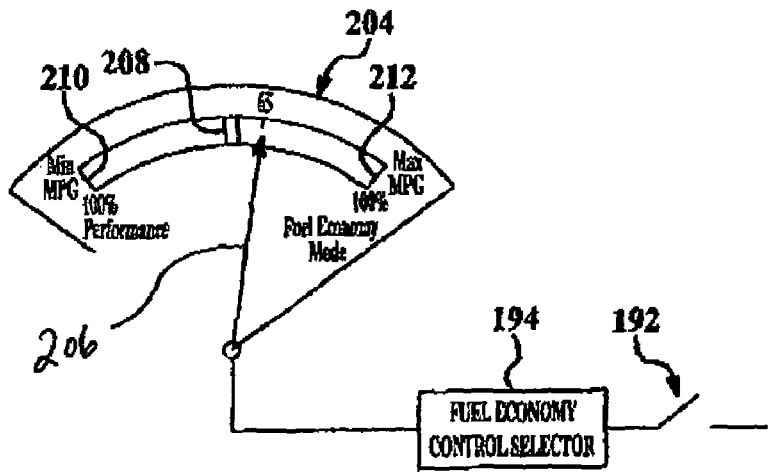
FIG. 3 illustrates a fuel economy selector gauge, a fuel economy control selector, and a switch for use in a vehicle having a fuel economy module in accordance with one embodiment of the invention.

FIG. 3 illustrates a fuel economy performance gauge 204, a fuel economy control switch 192, and a fuel economy control selector 194 for use in a vehicle having a fuel economy control module 86 in accordance with one embodiment of the invention.

In one embodiment of the invention, a driver may select a desired fuel economy associated with a predefined numerical value such as miles per gallon which may range between a minimum fuel economy value 210 associated with a high performance mode and a maximum fuel economy value 212 associated with a fuel economy mode.

As shown in a non-limiting example in FIG. 3, the selector 194 may be adjusted to select a desired fuel economy value, such as, for example a MPG value of 65 wherein, the fuel economy mode is operating in a more efficient fuel economy mode than in a performance mode. A first gauge indicator arrow 206 may be used to show the driver's selected fuel economy value.

In another example (not shown), the customer may set the control to 30 mpg, thus, the vehicle fuel economy will be reduced but the vehicle performance will be enhanced.

Additionally, a second indicator bar 208 may be provided on the gauge to indicate an actual fuel economy operation condition, shown as 60 MPG for illustrative purposes.

In one embodiment of the invention, rather than setting a specific mpg target, a fuel economy selector dial associated with the fuel economy selector 194 may be provided to select a balance between 'Performance' and 'Fuel Economy'. The selector may be adjusted by the customer in terms of a percentage of fuel economy and performance desired without reference to specific fuel economy numerical value.

The gauge 204 may incorporate either one of or both of the performance/economy balance indicators and the specified fuel economy indicator. FIG. 4 illustrates a control system strategy 220 of the HEV 10 having a fuel economy control module 86 of the present invention used in combination with the VSC 78. The system 220 combines a fuel economy control module controller (such as a micro-processor) with the VSC 78 to receive input signals from an accelerator pedal 188, a cruise control system 190 having an associated cruise control switch or button, a brake pedal 186, a fuel supply 180, a temperature climate controller 200 in communication with an air-conditioner 66 and heater system 198, a selectable fuel economy control switch 192, a fuel economy control selector 194, a wheel speed sensor 184, a battery 20, auxiliary loads 46, and from an IFT 202.

As noted above, the driving motor may be an electric motor, an internal combustion engine or a confirmation thereof, or any power delivering means such as a fuel cell. The VSC 78 communicates output signals to a dashboard display including a fuel economy gauge 204.

The cruise control system 190 may be an adaptive control system that operates to maintain a constant speed set by a driver. The cruise control may be set to on or off and may have an optional resume feature. Additionally, the cruise control may be cancelled if so desired by a driver.

The fuel economy control logic 196 may be a microprocessor in communication with the VSC 78 and receive signals from the cruise control system 190, the fuel economy control switch 192, and the fuel economy control selector 194 to determine fuel consumption when operating in a fuel economy mode.

The wheels 40 are in electro-mechanical communication with the integrated power train system 202 which may include a power source 14 in operative communication with the battery 20 to power the HEV 10 shown in FIG. 1, or alternatively a power source defined by elements 154, 162, 170, 172, 176, and 178 to power the fuel cell vehicle 150 shown in FIG. 2. Inputs from the wheel speed sensor 184 are communicated from the wheels 40 to the rear speed sensor and to the VSC 78. The climate control system 200 is provided in communication with the VSC 78 and correlates and controls climate within a vehicle cabin compartment in accordance with fuel economy climate control maps 254. Additionally, brake pedal inputs 186 associated with brake pedal control maps 250 are also put into inputs into the VSC 78. Similarly, accelerator pedal inputs 188 associated with the acceleration/deceleration control maps 252 are also input into the VSC 78.

In order to obtain better fuel economy at the expense of performance, the control system can for example, perform any of the following functions: reduce the acceleration allowed; interpolate acceleration and braking associated with a desired fuel economy based on accelerator pedal and brake pedal maps; reduce the cabin heating performance; reduce the cabin A/C performance; increase the number of stop/starts associated with the vehicle; reduce the controlled smoothness of associated vehicle stop/starts; and increase the error tolerance associated with a cruise control set speed.

A fuel economy control strategy is provided for an alternative fuel vehicle that provides a fuel economy mode associated with the vehicle; selects a desired fuel economy preference to operate the vehicle when the vehicle is operating in the fuel economy mode; and then operates the vehicle in the fuel economy mode in accordance with the selected desired fuel economy preference.

Figure 5:
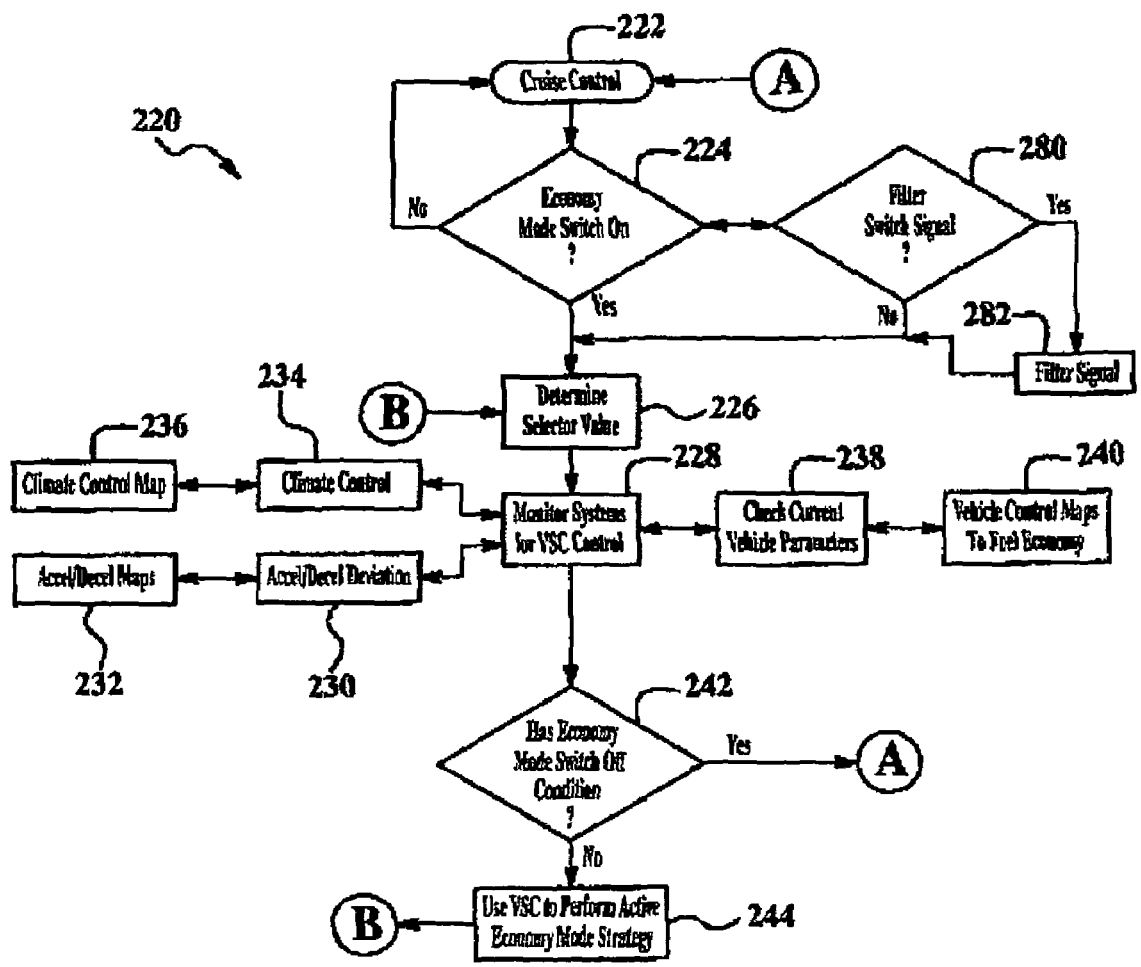
FIG. 5 illustrates a control method of a vehicle having a fuel economy mode module in accordance with one embodiment of the invention

A fuel economy control system strategy 220 is shown as an illustrative flowchart in FIG. 5. Initially, a cruise control state is determined, the state determined whether a driver has selected a cruise control operation 222 to set a speed that the driver wishes to maintain. Additionally, a determination is made of an on or off state of the economy mode switch (224). A driver may choose to turn on or off a fuel economy control switch thereby enabling or disabling running of the vehicle in a fuel economy control mode.

The cruise control system may be actuated by the cruise control button. The fuel economy control switch that may be in the form of a multi-function button in operative communication or with the cruise control button or alternatively, may be provided as two separate switches or actuatable buttons.

If the driver does not turn on the economy mode control switch, then once again the state of the cruise control is determined (222). Thus, if the cruise control is on and the economy switch is off, then the vehicle will remain in cruise control.

If the economy switch is on, then a determination is made whether the economy mode signal commands should be filtered 280. Pressing of the fuel economy button during vehicle accelerations may cause an unnecessary noticeable change in wheel torque, engine RPM, etc. The control strategy's recognition/interface to the economy button may need to be filtered for optimum use. For example, under certain operating condition, repeated pressing of button could cause repeated engine on/off. Therefore, this condition would be filtered. Thus, the condition may be filtered (282) by applying changes only during low/moderate wheel torque demands. Once the fuel economy control switch is actuated, i.e. turned on, then a fuel economy control selector value is determined (226).

Optionally, the operation of actuating the fuel economy control switch and determining a fuel economy control selector valve may be performed in either one or a combination of steps.

The VSC determines optimal economy management based on associated acceleration/deceleration deviations, climate control information, and other vehicle parameters that are monitored by the VSC (228).

The VSC monitors the climate control system (224) when the vehicle is in a fuel economy mode. The climate control system communicates with an associated climate control map (236) that correlates temperatures associated with an optimal fuel economy mode for further monitoring by the VSC. The VSC monitors whether deviations in accelerations or decelerations are occurring (230) and compares the monitored deviations with fuel economy acceleration/deceleration control maps (232).

The VSC further operates to associate a plurality of vehicle parameters with a desired fuel economy control condition (238). Such parameters may include vehicle parameters such as speed, a battery state of charge, and fuel consumption parameters. The parameters may be associated with vehicle control maps (240) that correlate the parameters with an associated fuel economy mode selected.

Both the climate control and the vehicle control map may be created using collected data through trial and error techniques. Additionally, based on the collected data, dynamic maps or tables may be generated or calculated by the VSC. The wheel speed may be checked against a wheel speed map associated with a state of charge of battery and fuel consumption indicator. A fuel supply sensor is in communication with a fuel supply and indicates an amount of fuel left provided by the fuel supply. A fuel consumption sensor is in communication with the fuel supply to determine actual fuel consumption.

Additionally, when a user selects a desired fuel economy then the VSC in combination with fuel economy control logic may calculate how much fuel may be consumed based on the vehicle parameters including speed and an amount of fuel left in the fuel supply.

Additionally, a determination is made whether the economy switch has been turned off (242). Conditions that may cause the economy mode switch to turn off may include a customer depressing the brake pedal, the customer's foot on an accelerator, or manual switching off of the economy mode switch. If the switch is off, then the cruise control operation 222 may once again be performed.

If the switch is on, as determined in 242, then optimal active control for a fuel economy mode is provided (244). The active control ensures that the vehicle fuel economy is operating in an optimal mode and may determine predefined values from associated maps or from calculated values.

Conditions considered when a vehicle is running in an economy mode include an optimal compressor control setup, an optimal IPT control setup, an optimal climate control setup, and an optimal auxiliary components or systems affecting fuel economy setup. The VSC operates to compensate for any deviations in the monitored vehicle parameters that exceed a predefined value or limit, thereby allowing the vehicle to operate optimally in the fuel economy mode.

The VSC operates to prevent large variations in acceleration or deceleration that exceed a predefined deviation limit (244). If deviations in acceleration or deceleration are detected by the VSC, the VSC ensures that control over the acceleration or deceleration remain smooth such that the deviation remains within a predefined limit. Thus, the VSC ensures smooth control over acceleration and deceleration.

In one embodiment of the invention, to provide more consistent acceleration performance during economy mode, the strategy may operate to limit acceleration performance to low battery like levels, which would in itself contribute to better economy.

In one embodiment of the invention, the fuel economy mode may utilize changes in the calibration/strategy of a hybrid electric vehicle to include incorporating more aggressive economy management by using different strategies for improving fuel economy, thereby emphasizing fuel economy attributes over performance attributes.

In an aggressive fuel economy mode, in accordance with one embodiment of the invention, the active control for economy mode (244) operates to control the IPT by lowering the low battery SOC limit at which the engine is forced on. When the vehicle is at a stop and during other low wheel torque demand conditions, running the engine is relatively inefficient. The primary side effect may be limited acceleration performance during low battery conditions.

Additionally the aggressive control strategy may include preventing the engine from entering inefficient operating conditions for the purpose of performance. Existing systems allow the engine to operate outside its optimum efficiency to provide higher torque for performance targets.

Slightly larger discharge power limits may be provided before the engine is forced on. Allowing slightly larger discharge power limits may not result in larger torque holes due to the fact that acceleration performance is also limited which limits the affect/existence of the torque hole.

Tip-in wheel torque response may be allowed to be slightly slower (delayed) to optimize efficiency and control of power delivery between engine and battery.

Also, engine speed may be controlled such that speed is selected more based on efficiency and less on intuitiveness. Using existing systems, the engine RPM may be controlled such that the customer does not perceive engine speed as unintuitive. At times, this can be at the expense of efficiency. Thus, using the present control strategy the engine speed can be efficiently controlled.

More frequent optimum BSFC engine operation may be forced by charging the battery if demanded wheel power is less than BSFC engine power. In one embodiment, the battery may be charged above target SOC. The engine may be forced off if operation of the engine is outside of optimum BSFC range.

Once the VSC has performed an active economy mode strategy 244, then once again, a determination may be made of the fuel economy control selector value 226 as shown in FIG. 5.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A fuel economy control system for an alternative fuel vehicle comprising:
   a fuel economy control module including associated fuel economy control logic that operates to allow a vehicle to operate in a fuel economy mode based on a desired fuel economy preference selected by a user, said alternative fuel vehicle selected from the group consisting of a hybrid electric vehicle and a fuel cell vehicle.

2. The fuel economy control system of claim 1, further comprising:
   a selectable fuel economy control switch; and
   a vehicle system controller in electrical communication with the fuel economy control logic, wherein the vehicle system controller and the fuel economy control logic cooperate to control the selectable fuel economy control switch thereby enabling or disabling, respectively a fuel economy mode.

3. The fuel economy control system of claim 2, further comprising a fuel economy control selector in operative electro-mechanical communication with a fuel economy switch, wherein the fuel economy control selector allows a user to select a desired fuel economy mode preference when the fuel economy control switch selected.

4. The fuel economy control system of claim 2, further comprising:
   a cruise control system having an associated cruise control button, wherein the fuel economy switch is in operative communication with the cruise control button and is turned on or off in accordance with depression of the cruise control button.

5. The fuel economy control system of claim 1, further comprising:
   a selectable fuel economy control switch that enables or disables a fuel economy mode operation, wherein the fuel economy control switch is controlled in accordance with the fuel economy control logic; and
   a fuel economy control selector in operative electro-mechanical communication with the fuel economy control switch that operates to allow a user to select a desired fuel economy mode preference when the fuel economy control switch is selected.

6. The fuel economy control system of claim 5, wherein the fuel economy control switch and the fuel economy control selector are in electromechanical communication with and are controlled by fuel control logic to allow a user to select a desired fuel economy mode preference.

7. The fuel economy control system of claim 6, further comprising:
   a fuel economy selector gauge having an indicator that indicates a fuel economy mode preference that ranges between 100 percent fuel economy and 100 percent vehicle performance.

8. The fuel economy control system of claim 5, wherein the desired fuel economy mode preference comprises:
   a predefined fuel economy preference of a desired economy value representing a distance per amount of fuel consumed.

9. The fuel economy control system of claim 5, wherein the desired fuel economy mode preference represents a percentage bf a balance between a fuel economy operation and a fuel performance operation.

10. A fuel economy control strategy for an alternative fuel vehicle comprising:

providing a fuel economy mode associated with the vehicle;

selecting a desired fuel economy preference to operate the vehicle when the vehicle is operating in the fuel economy mode; and operating the vehicle in the fuel economy mode in accordance with the selected desired fuel economy preference, said vehicle selected from the group consisting of a hybrid electric vehicle and a fuel cell vehicle.

11. The fuel economy control system strategy of claim 10, wherein said desired fuel economy preference comprises a value representing a distance per amount of fuel consumed.

12. The fuel economy control system strategy of claim 10, wherein said desired fuel economy preference comprises a value representing a percentage of a balance between a fuel economy operation and a fuel performance operation.

13. A fuel economy control strategy for an alternative fuel vehicle comprising:

providing a vehicle system controller for control of all systems within the vehicle; and providing an economy control module having associated economy control logic that cooperates with the vehicle system controller to control fuel economy within said vehicle in accordance with a predefined fuel economy preference, said predefined fuel economy preference comprises at least one of:

a value representing a distance per amount of fuel consumed; and, a value representing a percentage of a balance between a fuel economy operation and a fuel performance operation.

14. The fuel control strategy of claim 13, further comprising:

determining a cruise control state;

determining a state of a fuel economy control switch;

determining a desired fuel economy control selected value;

using the vehicle system controller to monitor vehicle parameter inputs associated with a fuel economy mode when the state of the fuel economy control switch is on;

determining the state of the fuel economy control switch once the system controller has monitored the vehicle parameter inputs; and optimizing active control of the vehicle in accordance with a driver's fuel economy preference when operating in a fuel economy mode and when the fuel economy control switch is one after monitoring the vehicle parameter inputs.

15. The fuel economy control system strategy of claim 14, further comprising:

controlling acceleration and deceleration deviations if the deviations exceed a predefined limit.

16. The fuel economy control system strategy of claim 14, further comprising:

controlling a vehicle compartment climate in the vehicle in accordance with climate control maps, wherein the climate control maps correlates temperatures associated with an optimal fuel economy mode.

17. The fuel control strategy of claim 13, further comprising:

inputting signals into both the vehicle system controller and the fuel economy from each of an accelerator pedal, a cruise control system, a brake pedal, a fuel supply, a temperature climate controller in communication with an air-conditioner and heater system, a fuel economy control switch, a fuel economy control selector, a wheel speed sensor, a battery, auxiliary loads, and an integrated power train.

18. The fuel economy control system strategy of claim 13, wherein said vehicle is selected from the group consisting of a hybrid electric vehicle and a fuel cell vehicle.

\* \* \* \* \*